United States Patent [19]

Cappiello

[11] 4,055,159
[45] Oct. 25, 1977

[54] GAS SAVING DEVICE

[76] Inventor: Luciano Cappiello, 52 Sunset Drive, Shelton, Conn. 06484

[21] Appl. No.: 721,402

[22] Filed: Sept. 8, 1976

[51] Int. Cl.$^2$ ............................................. F02M 25/06
[52] U.S. Cl. ............................ 123/119 B; 123/124 R; 123/119 DB; 137/480; 123/119 CG
[58] Field of Search .......... 137/480; 123/124, 119 D, 123/119 DB, 119 B, 119 CG

[56] References Cited

U.S. PATENT DOCUMENTS

| | | | |
|---|---|---|---|
| 1,280,569 | 10/1918 | Smith | 123/119 B |
| 1,712,939 | 5/1929 | Short | 123/119 B |
| 1,761,970 | 6/1930 | Clason | 123/119 B |
| 2,291,879 | 8/1942 | Chandler | 123/119 B |
| 2,681,051 | 6/1954 | Robinson | 123/119 B |
| 3,158,142 | 11/1964 | Bradshaw | 123/119 B |
| 3,176,670 | 4/1965 | Sinibaldi | 123/119 B |
| 3,313,281 | 4/1967 | Schneider | 123/119 B |
| 3,358,661 | 12/1967 | Garner | 123/119 B |
| 3,495,578 | 2/1970 | Guarneschelli | 123/119 B |
| 3,809,035 | 5/1974 | Winton | 123/119 B |

Primary Examiner—Wendell E. Burns

[57] ABSTRACT

An auxiliary air inlet device for internal combustion engines in motor vehicles includes an elongated tubular housing means adapted to be mounted relative to the combustion engine, and mounting means for removably connecting one end of an air filter to one end of the housing means, with means for connecting the housing means in spaced relation to the air filter to the carburetor and P.V.C. valve of the motor vehicle. A valve is mounted within the housing means and adapted to be moved between an open position permitting the flow of air therethrough to a closed position preventing the flow of air therethrough. The valve includes a valve member having an exterior surface conforming to the interior configuration of the housing means in the closed position of the valve, and inlet passages extending across the exterior surface of the valve member in spaced relationship to each other for the air to flow therethrough in the open position of the valve. Lever means is operatively associated with the valve member, and includes a lever arm having a free end and a fixed end thereof coupled to the axis of the valve member for angular rotation thereof within the housing means between the open and closed respective positions. Control means is operatively associated with the lever means to be manually controlled from within the motor vehicle.

10 Claims, 2 Drawing Figures

GAS SAVING DEVICE

BACKGROUND OF THE INVENTION

The present invention relates to the internal combustion engine art and more particularly relates to an operable valve for supplying additional air for admixture with fuel introduced into the engine.

Although various prior art devices have been proposed for an auxiliary air intake for internal combustion engines, they are of a complicated nature and have inherent mechanical problems associated therewith.

The inventor of the present invention has constructed, operated, and tested a novel device hereinafter described in detail to provide a savings of fuel with the device installed. Tests conducted on a 1967 Chevrolet with a 327 cubic inch engine, in perfect tune, gave no more than 11 or 12 miles per gallon in the city and no more than 16 or 17 miles per gallon on the highway. With the device of the present invention installed on the automobile, the mileage of 19 miles per gallon was obtained on the road as well as a comparable savings for city driving.

OBJECTS OF THE INVENTION

An object of the present invention is to provide an improved gasoline economizer valve for adaptation to an internal combustion engine of a driven vehicle which affords an optimum supply of additional air for admixture with the combustible fuel delivered to the combustion chambers of the engine whereby fuel is saved.

Another object of the present invention is to provide an improved gasoline economizer valve of the indicated nature which is additionally characterized by its capability of simple adjustment to afford the highly effective results.

Other objects and advantages of the present invention will become apparent as the disclosure proceeds.

SUMMARY OF THE INVENTION

An auxiliary air inlet device for internal combustion engines in motor vehicles, comprising elongated tubular housing means adapted to be mounted relative to the combustion engine and mounting means for removably connecting one end of an air filter to one end of the housing means, with means for connecting the housing means in spaced relation to the air filter to the carburetor and P.V.C. valve of the motor vehicle.

A valve is mounted within the housing means and adapted to be moved between an open position permitting the flow of air therethrough to a closed position preventing the flow of air therethrough. The valve includes a valve member having an exterior surface conforming to the interior configuration of the housing means in the closed position of the valve and inlet passages extending across the exterior surface of the valve member in spaced relationship to each other for the air to flow therethrough in the open position of the valve.

Lever means is operatively associated with the valve member and includes a lever arm having a free end and a fixed end thereof coupled to the axis of the valve member for angular rotation thereof within the housing means between the open and closed respective positions.

Control means is operatively associated with the lever means to be manually controlled from within the motor vehicle, and the control means includes a control link pivotably coupled to the free end of the lever arm and having the other end thereof extending into the vehicle to control therefrom. Bracket means is connected to the housing means and adapted to support the control means during movement thereof. The control means includes a cable portion connected to the lever arm at one end thereof, and the opposite end thereof connected to the control link.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
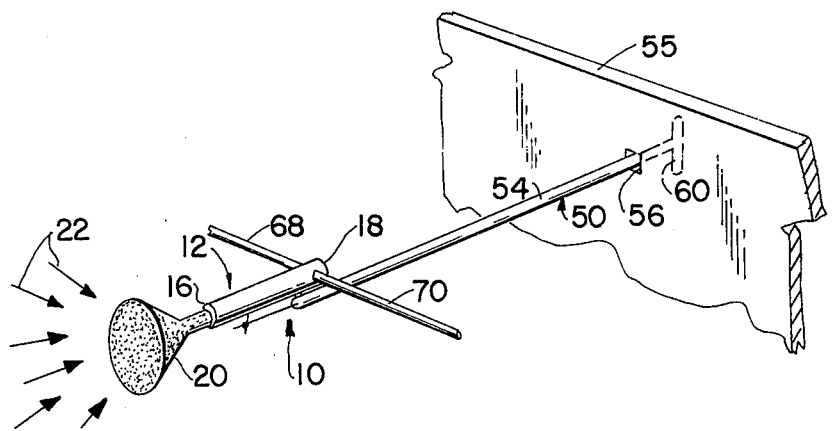
FIG. 1 is a perspective view of the device in accordance with the present invention.
Figure 2:
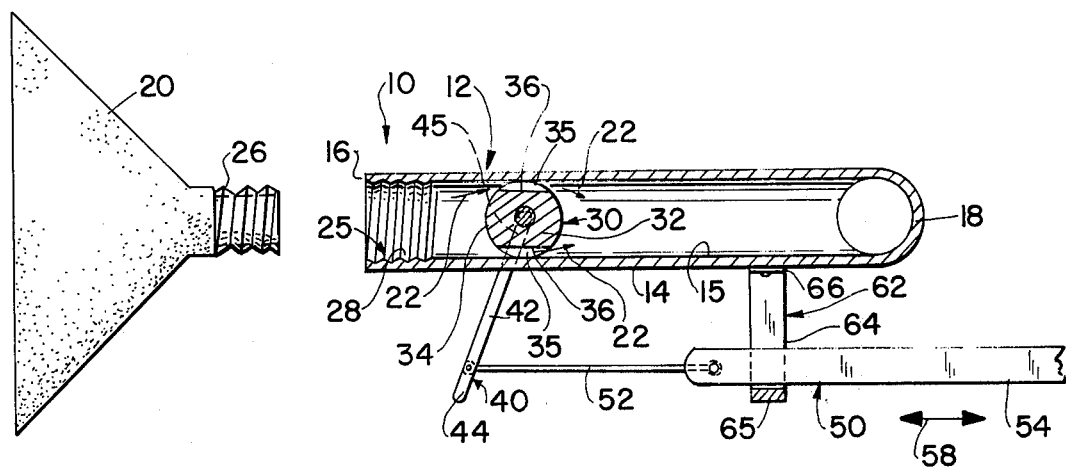
FIG. 2 is a side view partly in section, illustrating the device of FIG. 1.

Referring to the drawings, there is illustrated in FIGS. 1 and 2 thereof an auxiliary art inlet device 10 for use with internal combustion engines in motor vehicles. The device 10 has been found ideally suited for use at speeds above 20 miles per hour and preferably at higher speeds around 50 miles per hour. The device 10 should be off when the vehicle is at idle, because it would cause a rough idle of the engine.

The device 10 includes elongated tubular housing means 12 adapted to be mounted relative to the combustion engine. The housing means 12 includes an outer wall 14 with an inner axially bore 15 having an open front end 16 and a closed rear end 18 in spaced relationship to the front end 16.

A replaceable air filter 20 is adapted to be used in conjunction with the device 10 such that the incoming air illustrated by arrows 22 flow through the filter. Mounting means 25 is provided for removably connecting one end 26 of the air filter 20 to the front end 16 of the housing means 12. This connection may be obtained by providing threads 28 within the axial bore 15 to mate with complementary threads on one end 26 of the air filter 20. In this way the mounting means 25 is adapted to readily permit the change of the air filter 20 from time to time.

A valve 30 is provided within the housing means 12 and adapted to be moved between an open position permitting the flow of air therethrough as illustrated by arrows 22 in FIG. 2. In the closed position of the valve 30 air is prevented from flowing downstream of the housing means 12. The valve 30 is illustrated in the open position in FIG. 2, and includes a valve member 32 which may have a spherical outer or exterior surface 34 conforming to the interior configuration of the axial bore 15 with a minimal spacing therebetween. In this manner when the valve member 32 is rotated to the closed position, essentially no air passes through the valve 30.

To permit the air to flow through the valve 30, inlet passages 35 are provided and extend across the exterior surface 34. Two passages 35 may be utilized and are in spaced relationship to each other for the air to flow therethrough in the open position of the valve 30, each inlet passage 35 includes a horizontally extending lower wall 36 defining the lower limit of each passage 35.

For manual control of the valve 30 lever means 40 is provided and operatively associated with the valve member 32. The lever means 40 includes a lever arm 42 having a free end 44 and a fixed end 45 coupled to the axis of the valve member 32 for angular rotation thereof within the housing means 12 between the open and closed respective positions.

To prevent control of the valve 30 from within the vehicle, control means 50 is provided and associated with the lever means 40. The control means 50 includes a cable portion 52 and a control link 54 joined together. One end of the cable 52 is pivotably connected to the free end 44 of the lever arm 42. The link arm 54 is so designed as to extend through the fire wall 55 which has an opening 56 for the link arm 54 to extend therethrough.

To permit movement of the control means 50 in the direction of double headed arrow 58, a handle 60 is provided within the vehicle and connected to one end of the lever arm 54. In this manner the driver of the vehicle will manually control the valve 30 depending upon the speed of the vehicle as previously discussed.

Because of the length of the control means 50, bracket means 62 is provided and as seen in FIG. 2 includes a bracket member 64 having a bottom rest 65 for supporting the control link 54 and having an upper end 66 permanently secured to the housing means 12. In this way bracket means 62 is adapted to support the control means 50 during movement thereof.

Adjacent the rear end 18 of the housing means 12 are appropriate connections 68 and 70 that extend transversely to the axial bore 15. One connection 68 is made to the carburetor, and the other connection 70 is made to the P.V.C. valve. In this manner an operative system is provided to obtain a savings in gasoline. The present invention may be easily installed on existing motor vehicles to provide the savings in fuel consumption set forth above. If desired, the valve may be automatically operated by a vacuum diaphragm at higher speeds.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. An auxilliary air inlet device for internal combustion engines in motor vehicles, comprising:
   a. elongated tubular housing means adapted to be mounted relative to the combustion engine,
   b. a replaceable air filter,
   c. mounting means for removably connecting one end of said air filter to one end of said housing means,
   d. means for connecting said housing means in spaced relation to said air filter to the carburetor and P.V.C. valve of the motor vehicle,
   e. a valve mounted within said housing means and adapted to be moved between an open position permitting the flow of air therethrough t a closed position preventing the flow of air therethrough, said valve including:
      1. a valve member having an exterior surface conforming to the interior configuration of said housing means in the closed position of the valve, and
      2. inlet passages extending across the exterior surface of said valve member in spaced relationship to each other for the air to flow therethrough in the open position of said valve,
   f. lever means operatively associated with said valve member, said lever means including a lever arm having a free end and a fixed end thereof coupled to the axis of said valve member for angular rotation thereof within said housing means between the open and closed respective positions, and
   g. control means operatively associated with said lever means to be manually controlled from within the motor vehicle, said control means including a control link pivotably coupled to said free end of said lever arm and having the other end thereof extending into the vehicle to control therefrom.

2. A device as defined in claim 1, and further including bracket means connected to said housing means and adapted to support said control means during movement thereof.

3. A device as defined in claim 1, wherein said control means includes a cable portion connected to said lever arm at one end thereof, and the opposite end thereof connected to said control link.

4. A device as defined in claim 1, wherein said housing means includes:
   a. a front end having threads associated therewith for receiving said replaceable air filter, such that said mounting means is adapted to readily permit the change of said air filter from time to time, and
   b. a closed rear end with said connecting means extending transversely thereto to permit the flow of air relative to the carburetor and P.V.C. valve.

5. A device as defined in claim 1, wherein said valve member has a spherical exterior surface to permit angular displacement within said housing means, and said inlet passages includes a horizontally extending lower wall defining the limit of each passage.

6. A device as defined in claim 5, wherein said housing means includes an axially extending bore adapted to receive therein said valve member and permit said angular rotation.

7. A device as defined in claim 6, and further including bracket means connected to said housing means and adapted to support said control means during movement thereof.

8. A device as defined in claim 7, wherein said control means includes a cable portion connected to said lever arm at one end thereof, and the opposite end thereof connected to said control link.

9. A device as defined in claim 7, wherein said housing means includes:
   a. a front end having threads associated therewith for receiving said replaceable air filter, such that said mounting means is adapted to readily permit the change of said air filter from time to time, and
   b. a closed rear end with said connecting means extending transversely thereto to permit the flow of air relative to the carburetor and P.V.C. valve.

10. A device as defined in claim 9, and further including a handle at one end of said control means within the vehicle.

* * * * *